United States Patent Office 3,465,063
Patented Sept. 2, 1969

3,465,063
HYDROGENATED DIOLEFIN BLOCK COPOLYMERS
Howard L. Hassell, San Leandro, and Alfred W. Shaw, Moraga, Calif., assignors to Shell Oil Company, New York, N.Y., a corporation of Delaware
No Drawing. Filed Oct. 6, 1965, Ser. No. 493,570
Int. Cl. C08f 27/25, 29/10
U.S. Cl. 260—876
5 Claims

ABSTRACT OF THE DISCLOSURE

A thermoplastic elastomeric block copolymer having the general configuration

A—B—A wherein, prior to hydrogenation, each A is a polymer block of a conjugated diene having 4–8 carbon atoms per molecule, such as butadiene, and B is an elastomeric homopolymeric block of an alkyl substituted conjugated diene having 5–8 carbon atoms per molecule, such as isoprene, said block copolymer being essentially completely hydrogenated.

---

This invention relates to elastomeric block copolymers having the structure of polyalpha olefins. More particularly, it is concerned with the preparation and products having the characteristics of a vulcanized elastomer.

The polymerization of alpha-olefins can lead either to products having the characteristics of thermoplastics, e.g., polyethylene or polypropylene or to elastomers, such as ethylene-propylene rubbers. Such materials are greatly affected by the specific catalyst system used insofar as the stereoregularity of the product is concerned and, thereby, the properties of the product.

Block copolymers of alpha-olefins having been produced by the periodic injection of several types of alpha-olefins resulting in block copolymers having properties somewhat different from random copolymers achieved by polymerization of mixture of the two monomers. However, the products so obtained are either those of the thermoplastic type or of the elastomeric type requiring vulcanization to achieve their maximum stress-strain properties.

Vulcanization of alpha-olefins presents numerous problems which have not been satisfactorily solved at the present time. While vulcanization is possible, the vulcanization recipes are either elaborate or expensive or the products so produced have exceedingly bad odor, and other disadvantages are usually encountered.

It would be of special benefit to obtain an alpha-olefin polymer having optimum elastomeric properties without the necessity of vulcanizing and at the same time, a "self-vulcanizing" rubber which has a minimum of unsaturation, thus promoting its thermal and oxidative stability. Up to the present time, however, such products have not been achieved due to the lack of proper relationship of the individual alpha-olefin blocks within a given block copolymer or to the solubility properties encountered during the polymerization process itself.

Certain difficulties are sometimes encountered in the preparation of block copolymers of alpha-olefins with respect to maintaining growing polymer chains in solution. This difficulty may be minimized or eliminated by the proper choice of solvents and temperature or by the choice of an indirect route for the preparation of the subject block copolymers.

It is an object of the present invention to improve the copolymerization of alpha-olefins. It is a particular object of the invention to provide an improved process for the production of block copolymers of alpha-olefins. It is a further particular object of the invention to provide a process for the preparation of block copolymers having the structure of alpha-olefin polymers but produced from initial polymers of conjugated dienes. It is a special object of the invention to provide a self-vulcanizing block copolymer of alpha-olefins. Other objects will become apparent during the following detailed description of the invention.

Now, in accordance with the present invention, block copolymers having the properties of a self-curing elastomer are produced which have the general configuration

A—B—A wherein each polymer block A is a homopolymeric block of an alpha-olefin having 2–8 carbon atoms per molecule, each block A having average molecular weight between about 8,000 and 100,000, and B is an elastomeric copolymeric block of at least 2 alpha-olefins, block B having an average molecular weight between about 35,000 and 500,000, the blocks A comprising between about 10–50% by weight of the block copolymers.

Still in accordance with the present invention, other block copolymers having essentially the structure of the alpha-olefin block copolymers just described comprise the same general structure

A—B—A the block copolymer prior to hydrogenation being one in which the blocks A are essentially unbranched polymer blocks of conjugated dienes while the block B is a branched polymer block of a conjugated diene, the block molecular weights and proportions of the blocks A being essentially those described for the alpha-olefin block copolymer, the subject conjugated diene block copolymer being hydrogenated substantially completely (i.e., over 90% of the unsaturated bonds) to provide a block copolymer of essentially the same structure as that described for the alpha-olefin block copolymer.

In further accordance with the present invention, a process is provided for the preparation of the latter type of polymer which comprises forming an essentially unbranched copolymer block of a conjugated diene as the first block; block copolymerizing therewith a conjugated diene having a branched configuration; and thereafter forming a copolymer block having the same structure as the first block. Specifically, a suitable block copolymer is polybutadiene-polyisoprene-polybutadiene The block copolymer is then substantially completely hydrogenated to provide the essentially saturated block copolymers of the present invention wherein the blocks A are not only saturated but are essentially non-elastomeric, while the block B is both saturated and elastomeric.

A further object of the invention comprises the formation of compositions 100 parts by weight of the subject block copolymers combined with 20–400 parts by weight of an alpha olefin polymer of the group consisting of alpha-olefin homopolymers and alpha-olefin random copolymers.

One of the desired routes for the preparation of the subject saturated block copolymers comprises the hydrogenation of block copolymers of particular conjugated dienes. The hydrogenation of such block copolymers converts them, in effect, to block copolymers having the structure of a block polymer of alpha-olefins. The products so obtained are highly desirable in that they are relatively "pure" in that little terminated polymer is present as a contaminating by-product. Such by-products as homopolymer or two-block copolymers are often undesirable.

The conjugated diene block copolymers are preferably prepared by one of two routes. These may be described as "sequential" on the one hand or as "coupling" on the other. Each of these routes involves the same initial stages: A conjugated diene hydrocarbon such as butadiene is subjected to solution polymerization in the presence of a lithium based catalyst, such as a lithium alkyl. Polymerization is conducted to the point where the first polymer block is formed, after which, without termination of the growing polymer chains, a branched chain conjugated diene is injected and polymerization is continued. In the sequential process, polymerization is conducted until the desired molecular weight of the entire second block is formed, after which a conjugated diene of the first type (e.g., butadiene) is injected in the system and the third polymer block is formed. If however, the coupling process is involved, the polymerization of the branched chain conjugated diene block is conducted until the molecular weight is only about one half of that desired, after which a coupling agent such as a dihalohydrocarbon, divinyl arene or carbon monoxide is injected in the system to couple the intermediate block copolymer. The products obtained by either process have the general configuration A—B—A, wherein each A is an essentially unbranched polymer block of a conjugated diene while B is a polymer block of a branched chain conjugated diene such as isoprene or 2,3-dimethylbutadiene. By "essentially unbranched" is meant a polymer block which does not contain regularly spaced or regularly oriented hydrocarbon substituents pendant from the back-bone of the polymer chain.

For the purpose of the present invention, it is necessary to subject the block polymers so obtained to hydrogenation. In order to be most effective, it is necessary to hydrogenate at least about 90% of the double bonds in the original block copolymer and preferably in excess of about 95%. These will be referred to in the specification and claims as "essentially saturated" block polymers. They resemble in close approximation the block copolymers obtained by the direct block copolymerization of alpha-olefins as more fully described hereinafter.

The type of catalyst employed for the production of the alpha-olefin self-curing block copolymers is of importance in obtaining the optimum properties desired for such compositions. The usual Ziegler catalysts, such as titanium halides and the like may be employed for this purpose together with aluminum halides or aluminum organo halides. It is preferred to use 5–1500 millimoles of titanium and 10–5000 millimoles of aluminum per liter of total reaction mixture.

The preferred types of catalysts are the vanadium based polymerization catalysts used in conjunction with aluminum-containing reducing agents. Preferred among these are three general classes of vanadium compounds, namely, those based upon vanadium alkoxides, vanadium salts of salicylic acids and vanadium salts of sulfonic acids. The hydrocarbon radicals making the most effective substituents directly attached to the salicylic acid radical are aliphatic, cycloaliphatic or aromatic as well as mixed types including aryl aliphatic, aryl cycloaliphatic, alkyl aromatic or cyclolakyl aromatic substituents. As a rule, the combined substituents contain no more than 20 carbon atoms per molecule.

Salicylic acids which contain one or more alkyl groups as substituents, in particular those alkyl groups which are linked to the aromatic nucleus by means of a tertiary or a quaternary carbon atom, are preferred. Suitable substituted salicylic acids from which the vanadium salts may be prepared are diisopropyl, di-secondary-butyl, di-tertiary-butyl, tertiary-amyl, ditertiary-amyl, dinormal-butyl, normal-hexyl, n-cyclohexyl, n-dodecyl, triisopropyl, and phenyl-salicylic acids. A particularly favorable alkoxide is vanadium sec-butoxide.

The preferred vanadium sulfonates are vanadium salts of organic sulfonic acids represented by the general formula

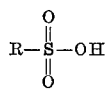

in which R is an aliphatic, cycloaliphatic or aromatic hydrocarbon radical. In the radical R, substituents may be present, for instance one or more aromatic nuclei in an aliphatic radical or 1–4 alkyl groups in an aromatic radical. Further, other substituents may also be present in the radicals, for instance hydroxyl groups, carboxyl groups, alkoxy groups, esterified carboxyl groups, oxygen atoms of carbonyl groups, amino groups, mercapto groups, halogen atoms, a second sulfo group, etc. The aliphatic and cycloaliphatic groups (radicals) may be branched or unbranched, saturated or unsaturated. The aromatic nuclei may be single benzene nuclei or condensed nuclei. As a rule R contains at least 6 and at most 30 carbon atoms. Very good results have been obtained with vanadium salts of mixed alkyl benzene sulfonic acids in which the alkyl group contains 8 to 20 carbon atoms, there being 1–4 alkyl radicals per benzene nucleus.

As example of reducing agents which, according to the invention, are applied together with the vanadium salts may be mentioned, inter alia, metallo-organo compounds, e.g., of metals belonging to groups 1–4 of the Periodic System, in particular aluminum alkyl compounds, by preference aluminum dialkylmonohalides, aluminum alkylsesquihalides, aluminum monoalkyldihalides, or mixtures of two or more of these types of alkyl compounds in various ratios. The alkyl groups in these compounds may contain different numbers of carbon atoms, and both branched and unbranched chains. As a rule, alkyl groups containing not more than 12 carbon atoms are applied, alkyl groups with 2 to 6 carbon atoms being preferred. The halogens in these compounds are particularly chlorine and bromine and by preference the former.

As a rule, the hydrocarbon radicals in the aluminum compounds contain no more than about 12 carbon atoms, alkyl groups with at least 2 and at most 6 carbon atoms being preferred. Any halogens which are present in these compounds are in particular chlorine and bromine, preferably the former.

The molecular ratio in which the catalyst components are present has a powerful influence upon both the rate and yield of the polymerization and on the properties of the polymer. In general, the number of atoms of vanadium and the number of aluminum atoms are in a ratio varying from about 0.05:1 and 2:1. In general, the highest yields and most desirable molecular weights are obtained when this ratio is between about 0.05:1 and 0.33:1. It is preferred to use 0.05–100 millimoles of vanadium and 0.5–50 millimoles of aluminum per liter of reaction mixture.

The block copolymerization is conducted in the presence of a hydrocarbon solvent which is essentially inert under the conditions of the polymerization. Alkanes and cycloalkanes such as hexane, cyclo-hexane or other saturated hydrocarbons having from 4–10 carbon atoms per molecule are preferred solvents for this purpose. Aromatic solvents, benzene, toluene, etc., also can be used as well as some chlorinated alkanes and cycloalkanes. These solvents may be modified by the additional presence of 0.5–10% by weight of a chlorocarbon such as carbon tetrachloride.

The polymerization is to be conducted under conditions which will avoid inadvertent termination of the growing polymer chain. This temperature range is usually between about −25° C. and +25° C., the preferred range being between about −15° and +15° C. If too low a polymerization temperature is utilized, a partially stereoregular elastomeric copolymer block B is formed which has relatively poor elastomeric properties. Since the principle objective is to achieve an elastomer having self-curing properties, it is important to maintain the maximum of elasticity in this block of the copolymer.

Where, in the present specification and claims, reference is made to average molecular weight this is based upon intrinsic viscosity measurements as they are graphically related to osmotic molecular weights. The latter agree closely molecular weights obtained by measuremens made upon tritiated samples of the polymers.

In order to achieve the self-curing properties of the desired end product, it is necessary to allow polymerization to form block A only to the range of an average molecular weight between about 8,000 and 100,000, preferably between about 10,000 and 75,000. If the average molecular weight of each block A is outside of the specified range, the properties of the polymer are drastically altered either in the direction of forming a thermoplastic having the properties of polyethylene or in the direction of an ordinary ethylene-propylene rubber, neither of which is desired in the present instance. The molecular weights referred to in the specification and claims are determined by intrinsic viscosity and light scattering methods and are weight average molecular weights.

Polymerization is therefore continued until the specified average molecular weight of this first block A is achieved, after which the monomer (if any remains) is swept out and/or replaced by the two alpha-olefins to be utilized in the formation of the elastomeric block B. This block is a copolymer block of a mixture of ethylene with at least one higher alpha-olefin having 3–6 carbon atoms per molecule, the mixture having an ethylene content between about 90% and about 20% by weight in order to obtain the desired elastomeric properties. Other than controlling this ratio of monomers taking part in the active creation of the elastomeric block B, the conditions of the polymerization are essentially the same as in the formation of block A.

In order to achieve the desired self-curing properties of the eventual block copolymer, it is necessary to restrict the average molecular weight of this elastomeric polymer block to between about 35,000 and 500,000, preferably between about 40,000 and 350,000.

Thereafter, the second block A is created by sweeping out the remainder of block B monomers and replacing them with block A monomer which is essentially a single alpha-olefin, preferably either ethylene or propylene. Block copolymerization is continued as described hereinbefore to form the desired average molecular weight, this being within the range specified for the initial block A.

The product of the block copolymerization process is thereafter recovered from the reaction mixture by coagulation if it has formed in solution (cement) with the reaction medium or by filtration if it is in the form of a suspended solid.

Properties which distinguish a self-vulcanizing block polymer from one which is not self-vulcanizing include the following:

(1) Solubility characteristics—the block copolymer is apt to be less soluble in solvents.

(2) Domain formation—i.e., block polymers have some crystalline aspects.

(3) Processability differs—block polymers are generally harder to process—also processability changes rapidly with temperature in the neighborhood of the softening or melting point of the A blocks. Hence, by raising the milling temperature, difficulties connected with processing can be eliminated or minimized.

(4) Block copolymers do not creep on standing as some unvulcanized rubbers do.

(5) Block copolymers show less set at break.

(6) Tensile properties (modulus, etc.) of block polymers can be changed over a wide range by varying molecular weight of blocks, relative proportions of blocks and composition of blocks—i.e., tailor the strength properties.

The block copolymers of this invention may be utilized for a wide variety of molding operations utilizing apparatus normally employed for the molding of thermoplastic materials. The compositions may be modified with flow assist agents. It is preferred, however, to restrict the portion of these agents so as to maintain maximum stress-strain properties in the finished compositions. Fillers may be employed if desired such as those utilized with ordinary rubbers. They may be further modified by the presence of asphalt, wax, polyvinyl compounds such as polystyrene, ordinary polymers of alpha-olefins such as polypropylene or polyethylene or may be mixed with either natural or synthetic rubbers such as polyisoprene or polybutadiene.

One of the most striking uses of the subject substantially saturated block copolymers is their combination with alpha-olefin polymers which are either homopolymers or random copolymers. Due to the similarity in chemical structure, the subject block copolymers are highly compatible with these second components. Furthermore, due to the similarity in refractive indices of the subject saturated block copolymers and ordinary alpha-olefin polymers, the compositions especially in the form of film or thin sheets have a strinking clarity which is typical usually of the unmodified alpha-olefin polymers such as polyethylene film or the like. The presence of 20–400 parts by weight of homopolymer or random alpha-olefin polymer in 100 parts by weight of the subject block copolymers creates a series of compositions having a striking set of properties not obtained by the unmodified polymers alone. For example, film having either high impact or elastomeric properties may be made which at the same time is essentially as clear as polyethylene or polypropylene film. Furthermore, the subject block copolymers may be treated by the method known for the treatment of polyethylene or polypropylene to make them receptive to dyes and printing ink. Consequently, no problems would be involved in the treatment of the compositions in this respect. Moreover, the subject alpha-olefin block copolymers may be blended with block copolymers having the general structure C—D—C wherein each C is a poly(vinylarene) block and D is a conjugated diene polymer block. The unusual solvent resistance, stability and clarity of these blends, in addition to their highly satisfactory elastomeric properties make them particular valuable for films, threads, laminates and molded goods.

The following examples illustrate the direct route for preparation of the subject block copolymers from alpha-olefins as well as the indirect route, by which is meant the preparation of the diolefin block copolymer followed by its hydrogenation.

EXAMPLE I

Sequential process for conjugated diene block polymer preparation

A block copolymer was prepared from butadiene and isoprene in cyclohexane as solvent at 50 to 55° C., utilizing butyl lithium as the catalyst. The initial polymer block was formed by polymerizing butadiene in the solvent in the presence of the catalyst to form a block having an average molecular weight of about 40,000. Without further treatment of the polymer so formed, isoprene was added and polymerization continued at about 50° C. to form the intermediate block copolymer having the configuration polybutadiene-polyisoprene-Li. Without further treatment of the intermediate, butadiene was introduced and polymerization continued until the three-block copolymer having the structure polybutadiene-polyisoprene-polybutadiene was formed, the average molecular weights of the individual blocks being 40,000–200,000–40,000.

EXAMPLE II

Coupling process for conjugated diene block polymer preparation

Butadiene was polymerized in cyclohexane solvent at 50–55° C. utilizing butyl lithium catalyst to form the initial polybutadiene block, after which isoprene was introduced and polymerization continued to form the intermediate block copolymer polybutadiene-1/2-polyisoprene-Li, wherein "1/2-polyisoprene" is meant a polyisoprene block having only about 1/2 of the molecular weight desired in the coupled final product. Dibromoethane was then introduced into the reaction mixture and coupling immediately took place to form a coupled product having essentially the same structure as the three-block copolymer formed in accordance with Example I.

EXAMPLE III

Hydrogenation of conjugated diene block copolymers

Hydrogenation of the polymer prepared by the process according to Example I was effected in the presence of a catalyst prepared by contacting nickel acetate with aluminum trietyl, in a molar ratio of 1.5/1 aluminum/nickel. The catalyst components were heated in cyclohexane for 30 minutes at 130° C. An amount of catalyst sufficient to provide 1% by weight of reduced nickel based on the polymer was suspended in a cyclohexane solution of the polymer, the solution containing 14% by weight of the latter. The reactor was pressured to 1500 p.s.i.g. with hydrogen and heated to a maximum of 140° C. with vigorous stirring. The total reaction time was 140 minutes (120 minutes above 130° C.). Absorption of hydrogen took place immediately and was probably completed within 30 minutes. The final reaction pressure at 140° C. was 1120 p.s.i.g. The product was essentially completely hydrogenated. The hydrogenated polymer was soluble in hot benzene.

EXAMPLE IV

Direct synthesis of alpha-olefin block copolymers

A three-block copolymer, polypropylene-EPR-polypropylene, was prepared using a gamma-$TiCl_3$-$Al(C_2H_5)_2Cl$ catalyst. The initial reaction conditions were 21.6 millimoles Ti per liter, 64.9 millimoles Al per liter, 26° C. and 500 cc. n-heptane solvent. At a reactor pressure of 5 p.s.i.g., a small amount of propylene was added to the reactor to initiate the active catalyst sites. After 15 minutes, reactor pressure was increased to 20 p.s.i.g. and propylene was added at 0.284 mole per minute for 2.5 minutes. One liter of n-heptane saturated with ethylene at 30 p.s.i.g. and 20° C. was added to the reaction mixture and, in addition, ethylene and propylene were bubbled through the reaction mixture at 0.0804 and 0.284 mol per minute respectively for 7.5 minutes. The reactor pressure was 25 p.s.i.g. during these operations. The ethylene then was omitted and the propylene rate increased many fold. Propylene was added for 5 minutes, after which the product was dumped into acetone to stop reaction.

Samples taken after the formation of each block showed cumulative intrinsic viscosities (150° C., decalin) of 2.7, 3.5 and 4.3 dl./g. respectively.

Block copolymers can also be prepared using a vanadyl diisopropyl salicylate-aluminum ethyl dichloride catalyst. In this case, polyethylene-poly(ethylene-propylene)-polyethylene copolymers can be formed using a procedure similar to the one cited above. However, in order to minimize chain transfer and premature deactivation of the catalyst, it is necessary to use an alkyl which is a less powerful reducing agent and also lower temperatures. Accordingly, 0° C., 0.25 millimoles V/liter, 2.5 millimoles Al/liter, 3 p.s.i.g. and n-heptane as solvent were the polymerization conditions employed.

EXAMPLE V

Physical properties of the saturated block copolymers

The three-block copolymer prepared by the titanium catalyst in Example IV was steam coagulated and then molded into tensile test specimens. The tensile strength at break was 2180 lbs./in., the 300% modulus was 1200 lbs./in., and the elongation at break was 640%.

The block copolymer prepared using the vanadium catalyst cited in Example IV was molded into thin tensile specimens at 160° C. It had a tensile strength at break of 1400 lbs./in., an elongation at break of 540%, and a set at break of 60%.

Two budadiene-isoprene-butadiene block copolymers prepared by the sequential process of Example I and hydrogenated were subjected to physical testing. Sample A had block molecular weights of 20,000–130,000–15,000, while Sample B had block molecular weights of 43,000–202,000–31,000. The hydrogenated copolymers were thermo plastic elastomers which displayed desirable rubbery qualities as well as excellent resistance to a wide range of solvents. Both polymers were milled easily and molded without difficulty. The lower molecular weight produce processed readily at about 150–160° C., while the higher molecular weight material processed readily at 185–200° C. Compression molded specimens were clear, colorless and glossy and exhibited a lively rubbery feel after stretching for 30 minutes at 300% elongation both polymers retained about 80% of the original stress. Sample B had a tensile strength of about 4000 p.s.i. at break and elongation of about 800% at break.

At room temperature the hydrogenated block copolymers were insoluble and merely swelled to a moderate extent in solvents which readily dissolve non-hydrogenated or unsaturated block copolymers formed from conjugated dienes.

Melt viscosities of these two samples were measured in a capilary melt viscometer. They showed surprisingly little dependance upon shear rate throughout the range of 1 to 15 reciprocal seconds. The following table compares the viscosities obtained under a variety of conditions.

TABLE I

| | Sample A | | Sample B | |
|---|---|---|---|---|
| | 150° C. | 180° C. | 220° C. | 250° C. |
| Shear rate, sec.$^{-1}$: | | | | |
| 1 | 90 | 58 | 155 | 90 |
| 15 | 90 | 54 | 145 | 89 |
| 70 | | 44 | | 52 |

We claim as our invention:

1. A thermoplastic elastomeric hydrogenated block copolymer having the general configuration:

A—B—A wherein, prior to hydrogenation, each A is an essentially unbranched homopolymeric block of a conjugated diene having 4–8 carbon atoms per molecule, each block A having an average molecular weight between about 8,000 and 100,000, and B is an elastomeric homopolymeric block of an alkyl-substituted conjugated diene having 5–8 carbon atoms per molecule, block B having an average molecular weight between about 35,000 and 500,000, at least 90% of the double bonds in the original block copolymer being reduced by hydrogenation, the blocks A comprising between about 10 and 50% by weight of the total copolymer.

2. A thermoplastic hydrogenated elastomeric block copolymer having the configuration, prior to hydrogenation of polybutadiene-polyisoprene-polybutadiene wherein each polybutadiene block has an average molecular weight between about 10,000 and 75,000, and the polyisoprene block has an average molecular weight between about 40,000 and 350,000, at least 90% of the double bonds in the original block copolymer being reduced by hydrogenation, the polybutadiene blocks comprising 12–40% by weight of the block copolymer.

3. The block copolymer of claim 1 which has been substantially completely hydrogenated.

4. The block copolymer of claim 2 which has been substantially completely hydrogenated.

5. A composition comprising
(a) 20–400 parts by weight of an alpha-olefine polymer of the group consisting of alpha-olefin homopolymers and alpha-olefin random copolymers; and
(b) 100 parts by wieght of a block copolymer according to claim 2.

References Cited
UNITED STATES PATENTS

| | | | |
|---|---|---|---|
| 2,997,453 | 8/1961 | Short et al. | 260—94.7 |
| 3,239,478 | 3/1966 | Harlan | 260—880 XR |
| 3,265,765 | 8/1966 | Holden et al. | 260—876 |
| 3,299,174 | 1/1967 | Kuhre et al. | 260—876 |
| 3,328,486 | 6/1967 | Crawford et al. | 260—876 |
| 3,358,053 | 12/1967 | Hostetler | 260—876 |
| 3,251,905 | 5/1966 | Zelinski | 260—879 |

MURRAY TILLMAN, Primary Examiner

M. J. TULLY, Assistant Examiner

U.S. Cl. X.R.

260—4, 879, 878, 94.7